(12) United States Patent
Kay

(10) Patent No.: US 8,870,169 B2
(45) Date of Patent: Oct. 28, 2014

(54) LOAD STABILIZING INSERT FOR VEHICLE SPRINGS

(71) Applicant: Jack Kay, Kent, WA (US)

(72) Inventor: Jack Kay, Kent, WA (US)

( * ) Notice: Subject to any disclaimer, the term of this patent is extended or adjusted under 35 U.S.C. 154(b) by 118 days.

(21) Appl. No.: 13/791,631

(22) Filed: Mar. 8, 2013

(65) Prior Publication Data

US 2013/0292887 A1 Nov. 7, 2013

Related U.S. Application Data

(60) Provisional application No. 61/643,216, filed on May 4, 2012.

(51) Int. Cl.
*B60G 17/00* (2006.01)
*B60G 11/10* (2006.01)
*B60G 11/02* (2006.01)
*B60G 17/02* (2006.01)
*F16F 1/22* (2006.01)

(52) U.S. Cl.
CPC .......... *B60G 11/10* (2013.01); *B60G 2202/112* (2013.01); *B60G 11/02* (2013.01); *B60G 2204/121* (2013.01); *B60G 17/023* (2013.01); *F16F 1/22* (2013.01)
USPC ...................... 267/52; 267/7; 267/48; 267/53

(58) Field of Classification Search
CPC .. B60G 11/40; B60G 11/113; B60G 2204/40; B60G 2200/31; B60G 2202/112; F16F 1/22; F16F 1/26
USPC ......... 267/52, 183, 66, 67, 7, 27, 32, 260, 47, 267/53, 48, 158; 29/402.01
See application file for complete search history.

(56) References Cited

U.S. PATENT DOCUMENTS

| | | | |
|---|---|---|---|
| 198,948 A | 1/1878 | Markham | |
| 684,839 A | 10/1901 | Maulhardt, et al. | |
| 1,022,775 A | 4/1912 | Denman | |
| 1,369,918 A | 3/1921 | Egan | |
| 1,440,829 A | 1/1923 | Hassler | |
| 1,595,411 A * | 8/1926 | Lord | 264/261 |
| 1,671,675 A * | 5/1928 | Hansen | 267/48 |
| 1,747,727 A * | 2/1930 | Monteith | 267/48 |
| 1,767,750 A | 6/1930 | Fisher | |
| 1,838,644 A * | 12/1931 | Tea | 267/48 |
| 2,301,398 A | 11/1942 | Haynes | |
| 2,525,065 A * | 10/1950 | Cover | 267/48 |
| 2,678,819 A | 5/1954 | Douglass | |
| 2,986,388 A * | 5/1961 | Page | 267/53 |
| 3,162,466 A | 12/1964 | Beisel | |
| 3,168,300 A * | 2/1965 | Giovinazzo | 267/48 |

(Continued)

*Primary Examiner* — Anna Momper
*Assistant Examiner* — San Aung
(74) *Attorney, Agent, or Firm* — R. Reams Goodloe, Jr.

(57) ABSTRACT

Load stabilizing inserts for a motor vehicle. The inserts include a base plate, a top plate spaced apart from and angularly pivotable with respect to the base plate, and one or more contact plates. The insert is sized and shaped for insertion between an overload spring and a spring pack in a motor vehicle such as a pickup truck. Four load stabilizing inserts may be installed to provide stable operation of the pickup truck when loaded at or near the maximum design gross operating weight of the vehicle. During those periods when the truck is not loaded, such as when a truck camper is not installed, the load stabilizing inserts may be angularly adjusted and secured in an open, non-working position, to provide a relatively soft ride during such position.

25 Claims, 7 Drawing Sheets

(56) References Cited

U.S. PATENT DOCUMENTS

| | | |
|---|---|---|
| 3,328,050 A | 6/1967 | Draves |
| 3,730,508 A | 5/1973 | Marian et al. |
| 3,843,148 A | 10/1974 | Wright |
| 3,901,494 A | 8/1975 | Sena |
| 3,944,245 A | 3/1976 | Kuhn |
| 7,651,107 B1 | 1/2010 | Chapin et al. |
| 2006/0076749 A1 | 4/2006 | Hoppert |
| 2007/0102854 A1* | 5/2007 | Hellwig ............... 267/27 |

* cited by examiner

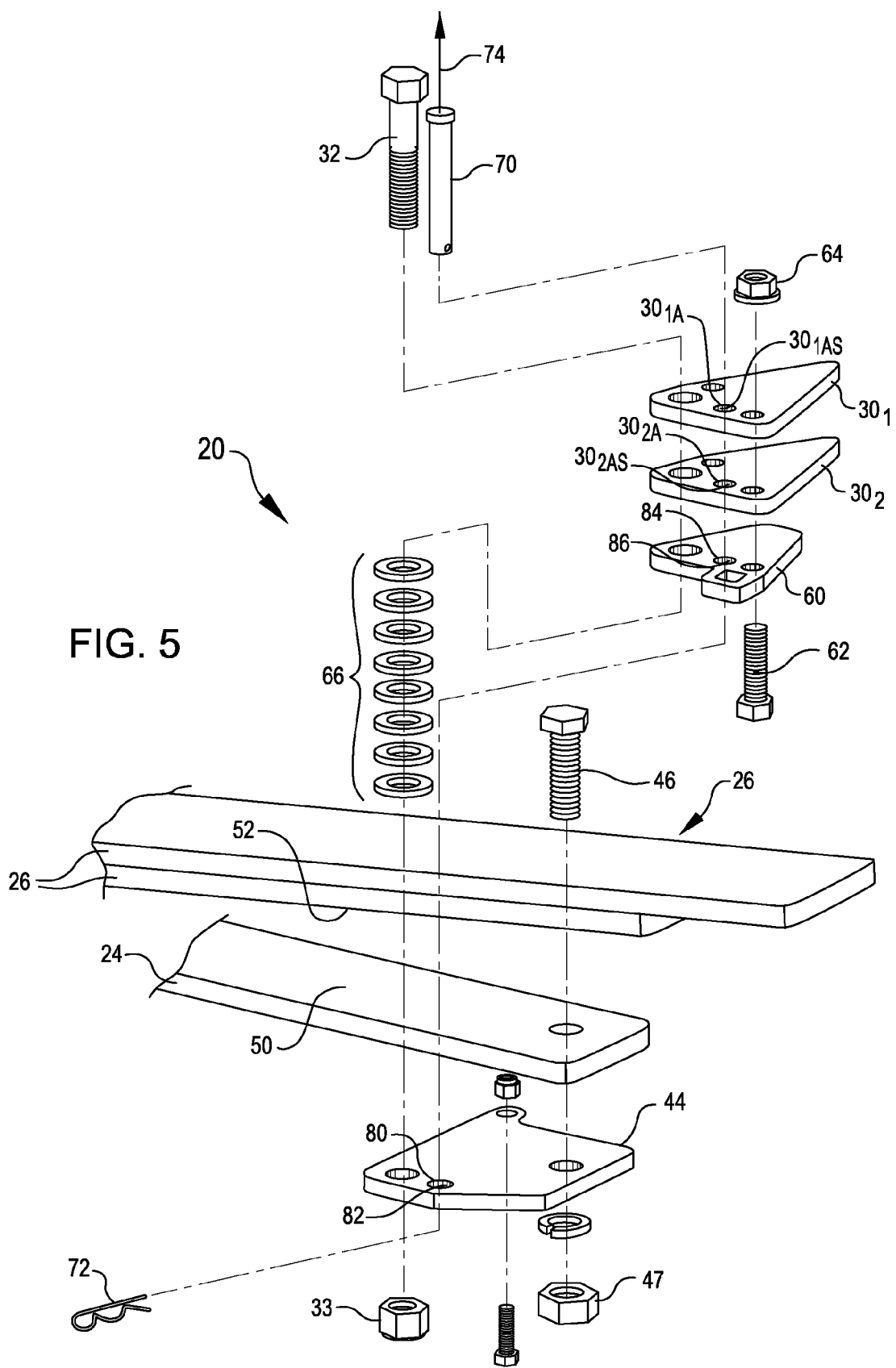

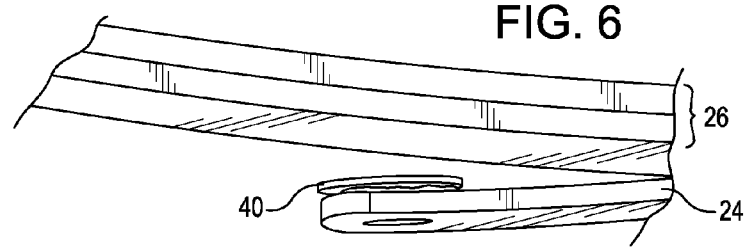
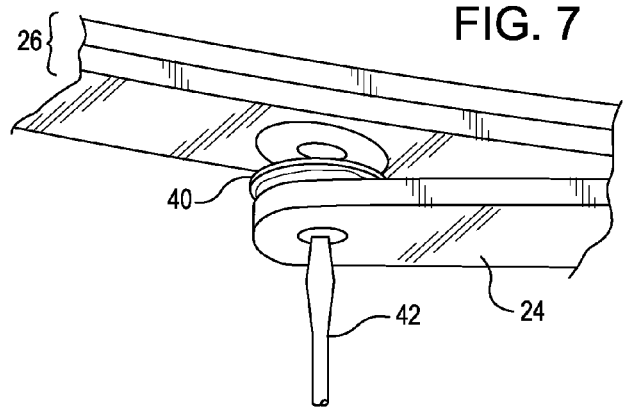
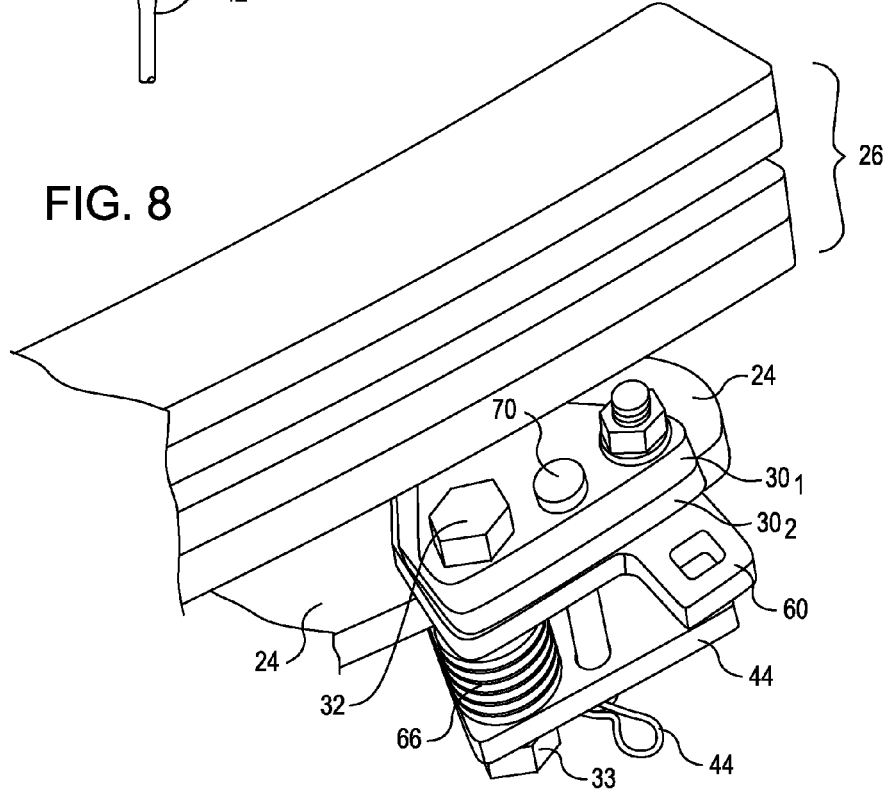

LOAD STABILIZING INSERT FOR VEHICLE SPRINGS

RELATED PATENT APPLICATIONS

This application claims priority from prior U.S. Provisional Patent Application Ser. No. 61/643,216, filed May 4, 2012, entitled LOAD STABILIZING INSERT FOR VEHICLE SPRINGS, the disclosure of which is incorporated herein in its entirety, including the specification, drawing, and claims, by this reference.

STATEMENT OF GOVERNMENT INTEREST

Not Applicable.

COPYRIGHT RIGHTS IN THE DRAWING

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to apparatus and methods for stabilizing motor vehicles when handling heavy loads.

BACKGROUND

Pickup trucks are frequently used as platforms on which truck campers are mounted for over-the-road use. Not infrequently, a load imposed on the suspension system of the pickup truck subsequently nears, or occasionally exceeds, the design load limits of the suspension system of the pickup truck, especially when used for carriage of a truck camper. Often, the total weight on the vehicle suspension system, considering empty weight of the vehicle, the empty weight of the truck camper, and the added weight of a truck camper, especially when outfitted with gear and supplies for camping, fishing, or hunting, results in relatively poor handling of a fully loaded pickup truck.

As a consequence of difficulties in handling experienced by drivers of pickup trucks carrying loaded truck campers, interest has grown in the potential for resolving such vehicle handling problems in an economical way. Similar problems exist when other motor vehicles tow trailers, particularly when heavy tongue weight is encountered. And, various motor vehicles, including pickups trucks, may experience similar problems when hauling loads other than campers. Thus, at this time, there remains a need for a load stabilizing apparatus, and a method for use of such apparatus, which could easily be affixed in an aftermarket setting to a variety of existing motor vehicles, including pickup trucks, vans, sports utility vehicles, recreational vehicles, motor homes, and even to certain commercial vehicles. Further, straightforward methods for installing and for using such load stabilizing devices on motor vehicles would be desirable. Moreover, it would be advantageous to provide such an apparatus using low cost, commonly available, and easily manufactured and assembled materials suitable for automotive suspension applications.

BRIEF DESCRIPTION OF THE DRAWING

Various aspects of the developments described herein will be described by way of exemplary embodiments, illustrated in the accompanying drawing figures in which like reference numerals denote like elements, and in which:

FIG. 5 provides an exploded perspective view of an embodiment for a load stabilizing insert in a configuration as just described in FIGS. 1 though 4 above, now showing various parts and pieces for construction and operation of the device, including a pivot pin in the form of a hex bolt, a plurality of spacer washers for providing vertical clearance between the bottom plate and the contact spacer plates, a locking pin and apertures in the spacer plates and the bottom plate for its operation, and a mounting bolt for attachment of the insert to the overload spring of a vehicle.

FIG. 6 provides an illustration of an overload spring on a vehicle, as well as an adjacent spring pack, showing preparation of the overload spring for mounting of a load stabilizing insert thereon.

FIG. 7 is an illustration of an overload spring on a vehicle, as well as an adjacent spring pack, showing preparation of the overload spring for mounting of a load stabilizing insert thereon, by removal of an existing or factory provided spacer or contact pad from the upper side of the overload spring.

FIG. 8 is an illustration of an embodiment for a load stabilizing insert in operating position, shown in the closed position with the uppermost surface of the contact spacer plates in contact with the lowermost surface of the lower spring in a vehicle spring pack, and showing how the overload spring is located above the bottom plate and below the top plate of the load stabilizing insert.

The foregoing figures, being merely exemplary, contain various elements that may be present or omitted from actual apparatus that may be constructed to provide various embodiments for a load stabilizing insert, or to various configurations for installation thereof, or to methods for use thereof. An attempt has been made to draw the figures in a way that illustrates at least those elements that are significant for an understanding of the components of an embodiment for a useful load stabilizing device for motor vehicles. However, various other elements for such apparatus, or for installation and use of the same, may be utilized in order to provide a useful load stabilizing device according to the concepts disclosed herein.

DETAILED DESCRIPTION

Figure 3:
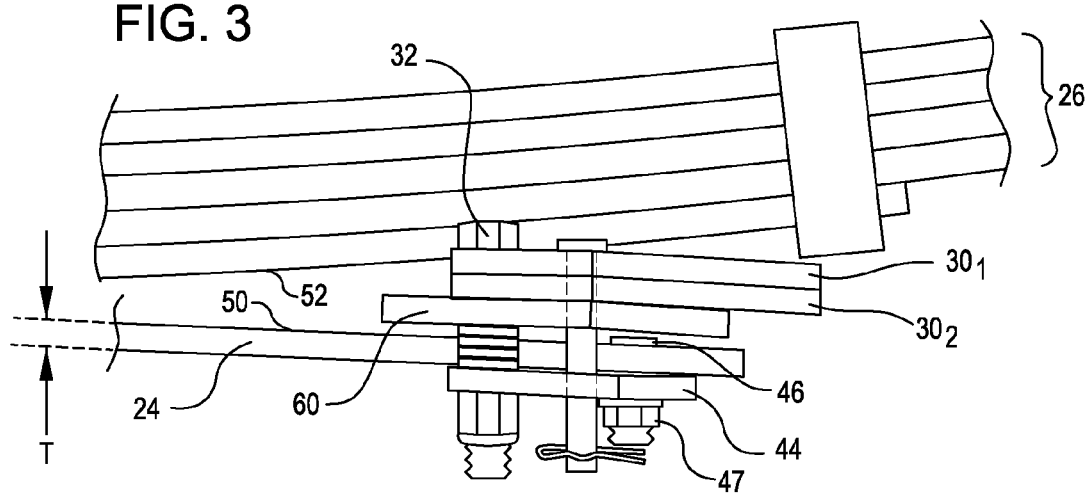
FIG. 3 provides a side view of the load stabilizing insert as just set forth in FIG. 1 above, showing the insert configured in a non-working or open position, with the bottom plate shown attached to an overload spring, and with the spacer plates oriented in the open position where they do not engage the lowermost spring in a vehicle spring pack.
Figure 4:
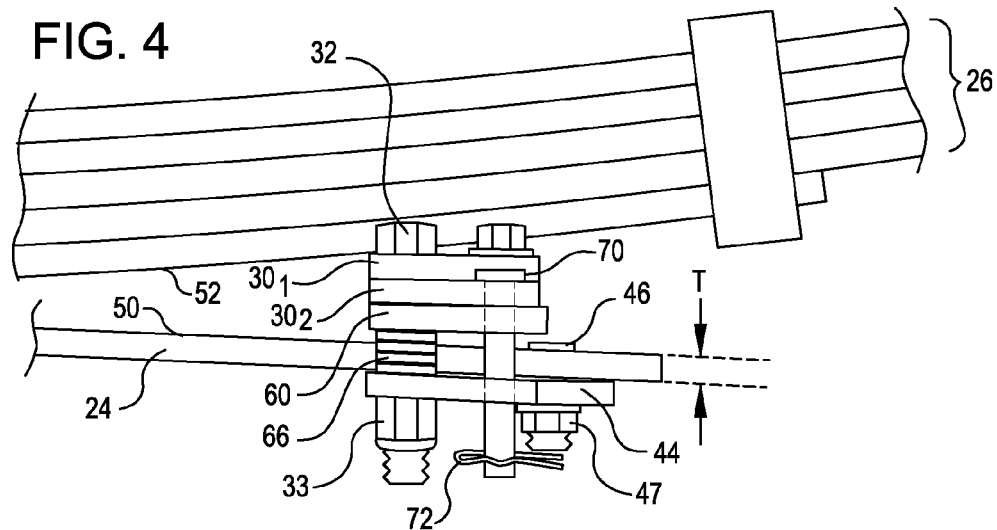
FIG. 4 provides a side view of the load stabilizing insert as just set forth in FIG. 2 above, showing the insert configured in a working or closed position, with the bottom plate shown attached to an overload spring, and with the spacer plates oriented in the closed position where they engage the lowermost spring in a vehicle spring pack.
Figure 9:
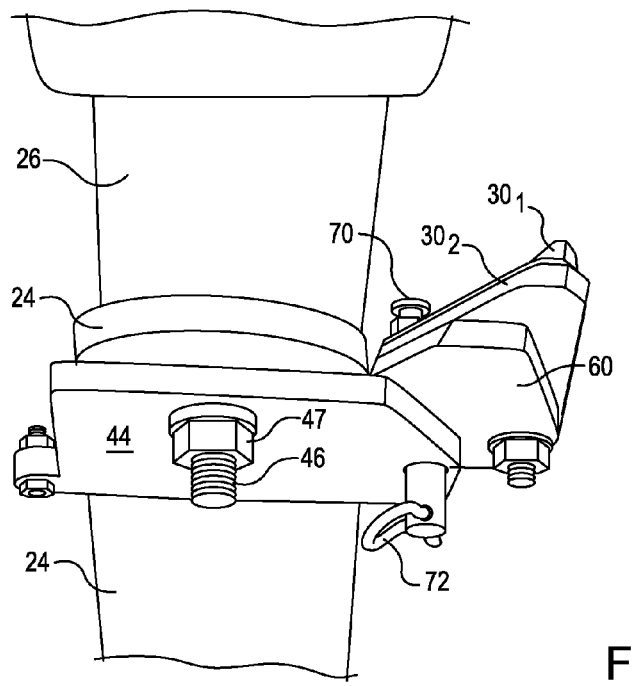
FIG. 9 is an illustration of an embodiment for a load stabilizing insert in non-working, open position, shown with the contact spacer plates out of position from underneath the lowermost spring in a spring pack on a vehicle, and wherein the pivot point is positioned inside of the spring pack.

As seen in FIG. 4, a load stabilizing insert 20 is provided, which when installed in sets in a selected motor vehicle 22 (portions of which are depicted in FIGS. 6 through 11), dramatically improve the handling characteristics of a motor vehicle 22 (not shown), when loaded. The load stabilizing inserts 20 are especially adapted for use in pickup trucks, but the use of load stabilizing inserts 20 is not limited thereto. For example, sport utility vehicles carrying loads, or coupe utility vehicles of a design such as, or somewhat similar to that of a Chevrolet El Camino, may also benefit, given their load carrying capabilities. A variety of motor vehicles encounter similar problems when they tow trailers, particularly when heavy tongue weight is encountered. And, various motor vehicles, including pickups trucks, may experience similar problems when hauling near or at capacity loads other than truck campers. Load stabilizing inserts 20 may easily be affixed in an aftermarket setting to a variety of existing motor vehicles, including pickup trucks, vans, sports utility vehicles, recreational vehicles, motor homes, and even to certain commercial vehicles. Generally, motor vehicles 22 which may utilize load stabilizing inserts as described herein may include a rear axle, and have a left side leaf spring set LS-SS and a right side leaf spring set RS-SS as noted in FIGS. 11A and 11B. In an embodiment, a left side leaf spring set LS-SS and a right side leaf spring set RS-SS may each include an overload spring 24 of thickness T and a spring pack 26, as seen in FIGS. 3 and 4. The thickness of an overload spring 24 may vary in different motor vehicles 22, but by way of example, and not of limitation, often a thickness T is found to be in the 0.25 inch to 0.5 inch range. In any event, motor vehicle 22 handling characteristics are changed by using the load stabilizing inserts 20 to reset the engagement point of each overload spring 24 with the accompanying spring pack 26. In use, as seen in FIGS. 11A and 11B, four load stabilizing inserts 20 may be provided in a set for installation in a motor vehicle 22 (not shown) having a rear axle 23, and left side spring packs $26_L$ and right side spring packs $26_R$. In an embodiment, the four load stabilizing inserts 20 in a set of inserts may be provided two per driver (left, in the US) side and two per passenger (right, in the US) side, as a left side front insert $20_{LF}$, a left side rear insert $20_{LR}$, a right side front insert $20_{RF}$, and a right side rear insert $20_{RR}$. In an embodiment as illustrated in FIG. 11A, the left side front insert $20_{LF}$, a left side rear insert $20_{LR}$, a right side front insert $20_{RF}$, and a right side rear insert $20_{RR}$ may be mounted to the outside of the left side spring packs $26_L$ and right side spring packs $26_R$. In an embodiment as illustrated in FIG. 11B, the left side front insert $20_{LF}$, a left side rear insert $20_{LR}$, a right side front insert $20_{RF}$, and a right side rear insert $20_{RR}$ may be mounted to the outside of the left side spring packs $26_L$ and right side spring packs $26_R$.

Figure 1:
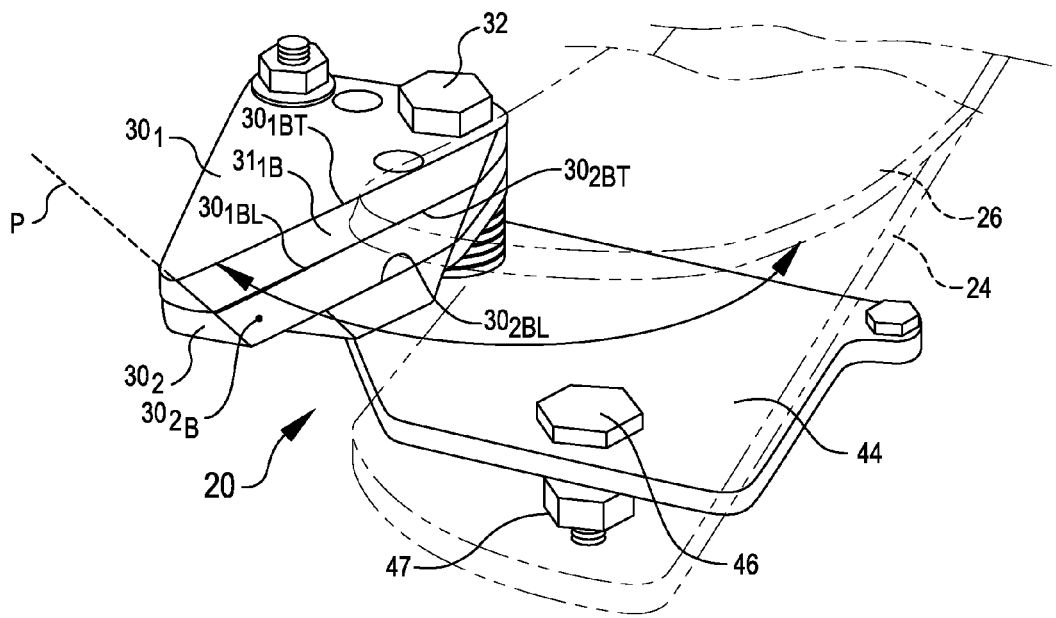
FIG. 1 provides a perspective view of a load stabilizing insert, showing the insert configured in a non-working or open position, with the bottom plate shown as if attached to a an overload spring which is represented by the lowermost redlines, and with the spacer plates oriented in the open position where they do not engage the lowermost spring (represented by the uppermost redlines) in a vehicle spring pack.
Figure 2:
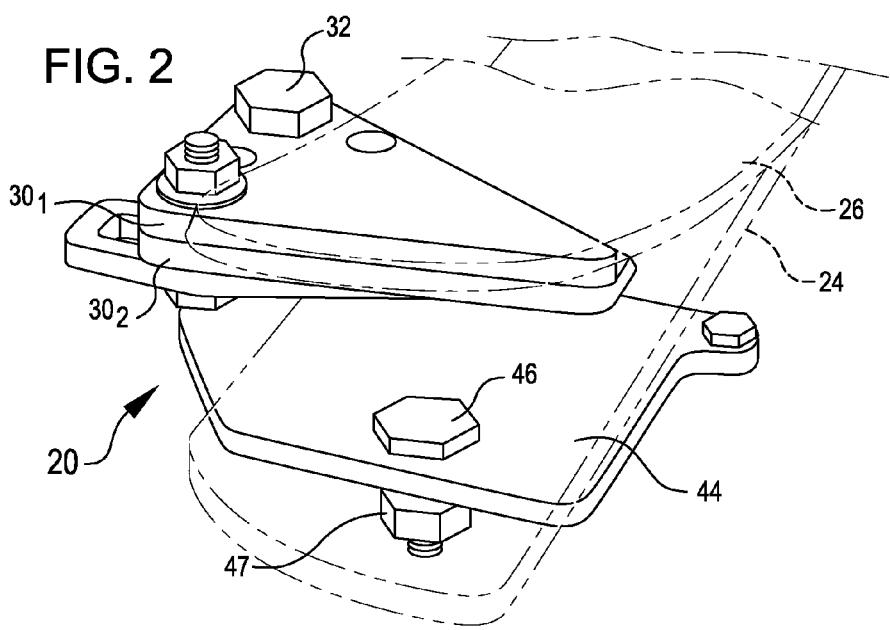
FIG. 2 provides a perspective view of a load stabilizing insert, showing the insert configured in a working or closed position, with the bottom plate shown as if attached to a an overload spring which is represented by the lowermost redlines, and with the spacer plates oriented in the closed position where they engage and provide support to the lowermost spring (represented by the uppermost redlines) in a vehicle spring pack.

As further seen in FIGS. 1 through 4, a load stabilizing insert 20 may be provided using one or more contact plates 30 (e.g., contact plate $30_1$, and $30_2$, etc.), which may be pivoted about a pivot pin or bolt 32, from an open, non-working position as shown in FIGS. 1 and 3, to a closed, working position as shown in FIGS. 2 and 4. Pivot pin or bolt 32 may be secured via nut 33, or functionally equivalent fastener system. In an embodiment, contact plates 30 (e.g., contact plate $30_1$, and $30_2$, etc.), may be provided in a tapered or generally triangular configuration, as seen in FIG. 1.

Installation is depicted in FIGS. 6 and 7. Starting on a passenger side of a motor vehicle 22, the factory overload contact pad 40 may preferably be removed from the overload spring 24. In some motor vehicles 22, a flat head screwdriver 42 as shown in FIG. 7 may be used to push an overload contact pad 40 upward to disengage it from the overload spring 24. Such factory overload contact pads 40 may be saved for re-installation if the load stabilizing inserts 20 are removed. However, it should also be noted that not all spring packs are shipped by the manufacturer (whether original equipment or aftermarket products) with pre-drilled overload springs; in such cases, a kit including a plurality of load stabilizing inserts 20 may be additionally provided for such "drilling required" applications on various vehicles. Then, the overload spring may be drilled to provide a mounting device for a load stabilizing insert 20 as described herein, and otherwise, installation proceeds as described herein. In an embodiment, a kit for installation of load stabilizing inserts 20 may include two load stabilizing inserts 20.

In an embodiment, a kit may be provided for stabilizing a motor vehicle having a rear axle with a left side leaf spring pack and a right side leaf spring pack. As described above, the left side leaf spring pack and right side leaf spring pack each have a lower side. Since, in some cases a motor vehicle may not be provided with overload springs from the factory, in some embodiments a kit may include a right overload spring having a lower side and a selected thickness T, which may be designated for such right overload spring as thickness $T_R$. Such a right overload spring may be sized and shaped for installation the right side leaf spring pack. Also, in some embodiments, a kit may include a left overload spring having a lower side and a selected thickness T, which may be designated for such left overload spring as $T_L$. In various applications, right overload spring and left overload springs may have a selected thickness T ($T_L$ for left overload spring and $T_R$ for the right overload spring) of about one-half inch (0.5") or thereabouts. In many cases, the left overload spring may be sized and shaped for installation with the right side leaf spring pack. In an embodiment, such a kit may include four load stabilizing inserts 20.

Figure 10:
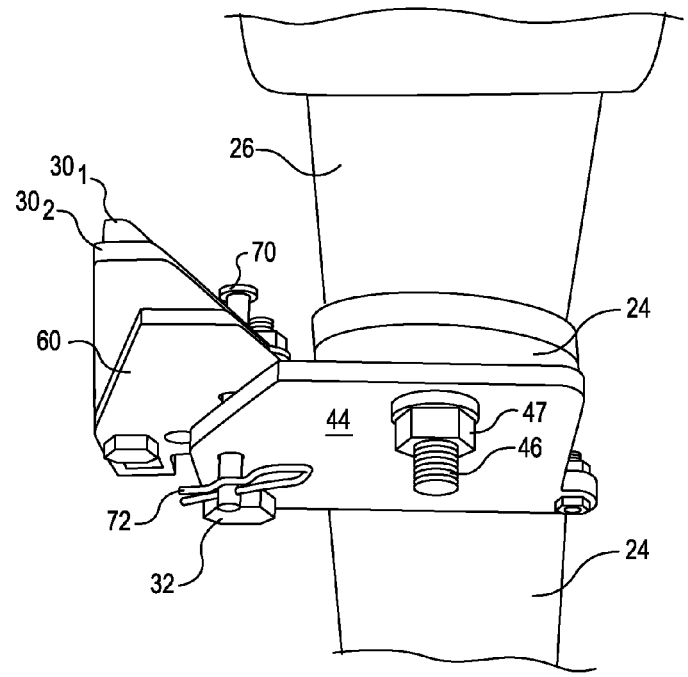
FIG. 10 is an illustration of an embodiment for a load stabilizing insert in non-working, open position, shown with the contact spacer plates out of position from underneath the lowermost spring in a spring pack on a vehicle, and wherein the pivot point is positioned outside of the spring pack, i.e. toward the rear tire from the spring pack.
Figure 11A:
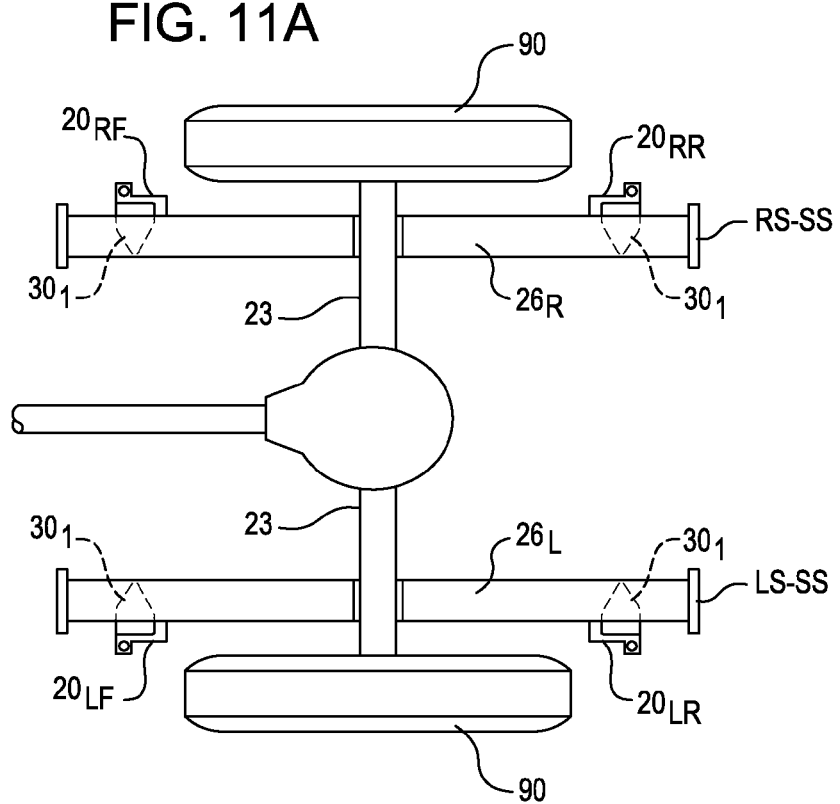
FIG. 11A is top plan diagrammatic view, taken as if below a pickup truck bed, showing the location of a left spring pack and a right spring pack mounted to an axle, and further illustrating the use of a set of four load stabilizing inserts on a vehicle, and here showing in phantom lines the contact spacer plates mounted in the working, closed position, and with each of the four load stabilizing inserts installed on the outside of each of the left spring pack and of the right spring pack.
Figure 11B:
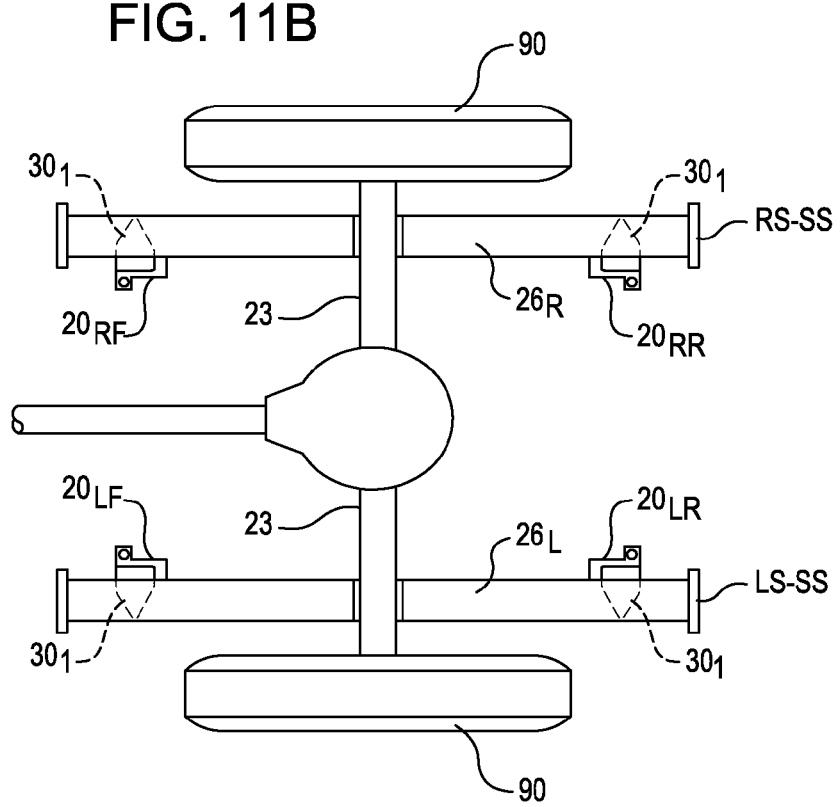
FIG. 11B is top plan diagrammatic view, taken as if below a pickup truck bed, showing the location of a left spring pack and a right spring pack mounted to an axle, and further illustrating the use of a set of four load stabilizing inserts on a vehicle, and here showing in phantom lines the contact spacer plates mounted in the working, closed position, and with each of the four load stabilizing inserts installed on the inside of each of the left spring pack and of the right spring pack.

On some motor vehicles 22, there may not be sufficient clearance to mount load stabilizing inserts 20 with the pivot point (in various embodiments, the pivot is provided by bolt 32) on the inside of spring pack 26, due to obstructions such as exhaust pipe hangers. In some motor vehicles 22, such obstructions may be relocated. Alternately, during installation, a pivot point such as bolt 32 may be placed on the outside of spring pack 26 (i.e., toward tire 90 as noted in FIG. 11), as illustrated in FIG. 10.

Figure 12:
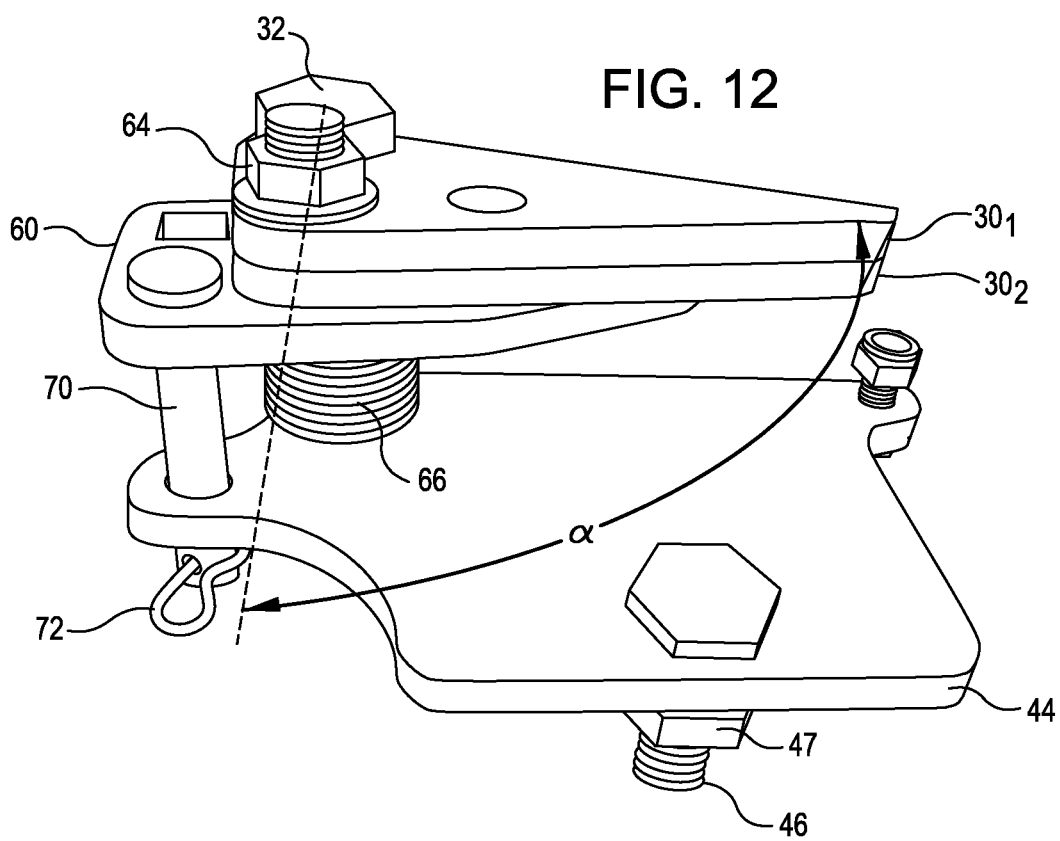
FIG. 12 is an illustration of an embodiment for a load stabilizing insert in a working, load accepting, closed position, illustrating an embodiment for a bottom plate, for a top plate, use of a pivot pin with spacer plates, as well as a locking pin with locking cotter pin.

Returning to FIGS. 1 through 4, in an embodiment, a bottom plate 44 may be placed under the overload spring 24, and affixed thereto such as via mounting bolt 46 and accompanying nut 47, or functionally equivalent fastener system. Then, the installer may determine how many of the contact plates ($30_1$, $30_2$, $30_N$, etc) may be utilized in a particular installation to bridge the gap (in the unloaded, installing condition) between the top 50 of the overload spring 24 and the bottom 52 of the spring pack 26 (see FIG. 3, 4, or 5). In an embodiment, a suitable number of contact plates ($30_1$, $30_2$, through $30_N$, where N is a positive integer, etc.) may be mounted above the top plate 60. A plate mounting bolt 62 and accompanying nut 64, or functionally equivalent fastener system, may be used to securely join the top plate 60 with the contact plates ($30_1$, $30_2$, through $30_N$) which are supported above the top plate 60. A spacer or spacers, such as a plurality of washers 66, may be utilized to space the top plate 60 above bottom plate 44. In an embodiment, spacers such as washers 66 may be placed around bolt 32, to enable bolt 32 and nut 33 (or equivalent fastening system) to secure the load stabilizing device at an appropriate location. For example see FIG. 4, showing washers 66 spacing apart the bottom plate 44 and the top plate 60. Once the load stabilizing insert 20 has been placed in an open, non-working (non-loadable) standby position, or alternately in a closed, working (loadable) position, a locking pin 70 and cotter pin 72 or functionally equivalent locking system may be utilized to securely locate the top plate 60 (and accompanying contact plates 30—i.e. $30_1$, $30_2$, through $30_N$,) at a selected angle alpha ($\alpha$) with respect to bottom plate 44 (see FIG. 12).

The cotter pin 72 prevents axial movement (i.e. in the direction of reference arrow 74 in FIG. 5) of locking pin 70. In an embodiment, the various components may be configured to provide an angle alpha ($\alpha$) of ninety (90) degrees. In an embodiment, a locking pin 70 may be located at a first aperture 80 defined by first sidewalls 82 is provided in the bottom plate 44, and a second aperture 84 defined by second sidewalls 86 in the top plate 60. The locking pin 70 is configured for insertion through the first aperture 80 and also through the second aperture 84, to prevent the bottom plate 44 from pivoting with respect to the top plate 60.

In an embodiment, as may be seen in FIG. 5, contact plates 30 (e.g., first contact plate $30_1$, second contact plate $30_2$, etc., through the Nth contact plate $30_N$) may include apertures $30_{1A}$, $30_{2A}$, through $30_{NA}$, respectively, for accommodating a locking pin 70 therethrough, to thereby secure a first contact plate $30_1$, a second contact plate $30_2$, etc. (through to Nth contact plate $30_N$, not shown) to the top plate 60 and to the bottom plate 44. In each of the one or more contact plates (i.e., first contact plate $30_1$, second contact plate $30_2$, etc., through the Nth contact plate $30_N$) an interior sidewall, noted in FIG. 5 by reference numerals $30_{1As}$ and $30_{2As}$ (through $30_{NAs}$, not shown) defines the respective contact plate locking aperture interior sidewall. The top plate 60 has a top plate locking aperture 84 therein defined by interior sidewalls 86. In an embodiment, the top plate 60 locking aperture 84 and each of the contact plate locking apertures $30_{1A}$, $30_{2A}$, through $30_{NA}$ may be configured for alignment, when the load stabilizing insert 20 is in a working position as shown in FIG. 5.

In an embodiment, load stabilizing inserts 20 may include one or more contact plates which have a beveled edge. For example, as seen in FIG. 1, first contact plate $30_1$ has a first beveled edge $30_{1B}$. Likewise, second contact plate $30_2$ has a second beveled edge $30_{2B}$. The first contact plate $30_1$ may include a first leading edge $30_{1BL}$. Likewise, the second contact plate $30_2$ may include a second leading edge $30_{2BL}$. Further, the first contact plate $30_1$ may include a first trailing edge $30_{1BT}$. Likewise, the second contact plate $30_2$ may include a second trailing edge $30_{2BT}$. In an embodiment, the second trailing edge $30_{2BT}$ and the first leading edge $30_{1BL}$ may be adjacent. In an embodiment the first beveled edge $30_{1B}$ and a second beveled edge $30_{2E}$ may oriented along a common plane, for example, extending in planar fashion from reference line P shown in FIG. 1.

A method of engaging or disengaging the load stabilizing inserts 20 may be practiced when the motor vehicle 22 is without payload, i.e., in a substantially empty weight condition. A change from an open, non-working position is best accomplished by setting up the motor vehicle 22 on a level surface with the front wheels chocked, and placing a floor jack under a receiver hitch until the spring packs 26 are unloaded, that is spring packs 26 on the right and left side of motor vehicle 22. Jack stands (not shown) may be placed under a frame of motor vehicle 22 for safety purposes. If additional clearance is needed, a pry bar may be used between the overload spring 24 and the spring pack 26 to provide further separation therebetween.

Generally, it may not be advisable to use load stabilizing inserts 20 in conjunction with the use of snow chains or cable chains (not shown) on tires 90, especially if the load stabilizing inserts 20 are mounted with the bolt 32 (which acts as a pivot pin) on the outside of the spring pack 26, for example as is illustrated in FIG. 11.

In the foregoing description, numerous details have been set forth in order to provide a thorough understanding of the disclosed exemplary embodiments for providing load stabilizing inserts 20 for motor vehicles, and in particular, for pickup trucks carrying campers. However, certain of the described details may not be required in order to provide useful embodiments, or to practice selected or other disclosed embodiments. Further, the description may include, for descriptive purposes, various relative terms such as surface, adjacent, proximity, near, on, onto, and the like. Such usage should not be construed as limiting. Terms that are relative only to a point of reference are not meant to be interpreted as absolute limitations, but are instead included in the foregoing description to facilitate understanding of the various aspects of the disclosed embodiments. Various items in the apparatus and in the method(s) described herein may have been described as multiple discrete items, in turn, in a manner that is most helpful in understanding such aspects and details. However, the order of description should not be construed as to imply that such items or sequence of operations are necessarily order dependent, or that it is imperative to fully complete one step before starting another. For example, the choice of where to mount a load stabilizing insert on a particular spring pack for a given vehicle make and model may be different as regards installation particulars amongst various installers. Further, certain details of installation may not need to be performed in the precise or exact order of presentation herein. And, in different embodiments, one or more items may be performed simultaneously, or eliminated in part or in whole while other items may be added. Also, the reader will note that the phrase "an embodiment" has been used repeatedly. This phrase generally does not refer to the same embodiment; however, it may. Finally, the terms "comprising", "having" and "including" should be considered synonymous, unless the context dictates otherwise.

Various aspects and embodiments described and claimed herein may be modified from those shown without materially departing from the novel teachings and advantages provided by this invention, and may be embodied in other specific forms without departing from the spirit or essential characteristics thereof. Embodiments presented herein are to be considered in all respects as illustrative and not restrictive or limiting. This disclosure is intended to cover methods and apparatus described herein, and not only structural equivalents thereof, but also equivalent structures. Modifications and variations are possible in light of the above teachings. Therefore, the protection afforded to this invention should be limited only by the claims set forth herein, and the legal equivalents thereof.

The invention claimed is:

1. A load stabilizing insert for a motor vehicle having a rear axle with a left side leaf spring set and a right side leaf spring set, said left side leaf spring set and said right side leaf spring set each comprising a spring pack and an overload spring of thickness T, said load stabilizing insert comprising:
   (a) a bottom plate, the bottom plate sized and shaped for attachment to the overload spring;
   (b) a top plate, said top plate (1) spaced apart from and (2) pivotally adjustable with respect to said bottom plate by an angle alpha (a);
   (c) a one or more contact plates, said one or more contact plates supported above said top plate, and secureable thereto, and
   (d) said top plate and said one or more contact plates adjustably positionable from an unloaded, standby position not loadable by the spring pack, to a working, loadable position below said spring pack.

2. A load stabilizing insert as set forth in claim 1, wherein a pivot pin is provided for adjustably positioning said top plate and said one or more contact plates.

3. A load stabilizing insert as set forth in claim 2, further comprising one or more spacers, said spacers separating said top plate above said bottom plate by at least the thickness T of said overload spring.

4. A load stabilizing insert as set forth in claim 3, wherein said one or more spacers are located on said pivot pin, between said bottom plate and said top plate.

5. A load stabilizing insert as set forth in claim 3, wherein one or more of said spacers comprises a washer.

6. A load stabilizing insert as set forth in claim 1, further comprising a locking pin, and wherein a first aperture defined by first sidewalls is provided in said bottom plate, and a second aperture defined by second sidewalls is provided in said top plate, and wherein said locking pin is configured for insertion through said first aperture and through said second aperture, to prevent said bottom plate from pivoting with respect to said top plate.

7. A load stabilizing insert as set forth in claim 6, further comprising a locking system for said locking pin, said locking system configured to prevent axial movement of said locking pin away from said bottom plate.

8. A load stabilizing insert as set forth in claim 7, wherein said locking system comprises a cotter pin.

9. A load stabilizing insert as set forth in claim 1, wherein one or more of said one or more contact plates further comprises a beveled edge, said beveled edge comprising a leading edge and a trailing edge.

10. A load stabilizing insert as set forth in claim 1, wherein said one or more contact plates comprises a first contact plate and a second contact plate.

11. A load stabilizing insert as set forth in claim 10, wherein said first contact plate comprises a first beveled edge, and wherein said second contact plate comprises a second beveled edge.

12. A load stabilizing insert as set forth in claim 11, wherein the first beveled edge has a first leading edge and a first trailing edge, and wherein said second beveled edge has a second leading edge and a second trailing edge, and wherein said first trailing edge and said second leading edge are adjacent.

13. A load stabilizing insert as set forth in claim 11, wherein said first beveled edge and said second beveled edge are oriented along a common plane.

14. A load stabilizing insert as set forth in claim 1, wherein said top plate has a top plate locking aperture therein defined by interior sidewalls, and wherein each of said one or more contact plates comprises a contact plate locking aperture defined by a contact plate locking aperture interior sidewall, and wherein said top plate locking aperture and each of said contact plate locking apertures are configured for alignment, when in a working position.

15. A load stabilizing insert for a motor vehicle having a rear axle with a left side leaf spring set and a right side leaf spring set, said left side leaf spring set and said right side leaf spring set each comprising a spring pack having a lower side and an overload spring having a lower side, the overload spring having a thickness T, said load stabilizing insert comprising:
   (a) a bottom plate, the bottom plate sized and shaped for attachment to the overload spring;
   (b) a top plate;
   (c) a pivot pin that pivotably connects said top plate and said bottom plate;
   (d) one or more spacers, said one or more spacers separating said top plate above said bottom plate by at least the thickness T of said overload spring, said top plate (1) spaced apart from and (2) pivotally adjustable with respect to said bottom plate by an angle alpha (a); and
   (e) a one or more contact plates, said one or more contact plates supported above said top plate and pivotably adjustable therewith, wherein said top plate and said one or more contact plates are adjustably positionable from an unloaded, standby position not loadable by the spring pack, to a working, loadable position below said spring pack.

16. A load stabilizing insert as set forth in claim 15, further comprising a locking pin, wherein
   a first aperture defined by first sidewalls is provided in said bottom plate,
   a top plate locking aperture defined by second sidewalls is provided in said top plate, and
   each of said one or more contact plates comprises a contact plate locking aperture defined by a contact plate locking aperture interior sidewall,
   and wherein said locking pin is configured for insertion through said first aperture, through said top plate locking aperture, and through said each of said contact plate locking apertures, to lock said bottom plate to said top plate and to each of said one or more contact plates.

17. A load stabilizing insert as set forth in claim 16, further comprising a locking system for said locking pin, said locking system configured to prevent axial movement of said locking pin upward from said bottom plate.

18. A load stabilizing insert as set forth in claim 17, wherein said locking system comprises a cotter pin.

19. A load stabilizing insert as set forth in claim 15, wherein one or more of said contact plates further comprise a beveled leading edge, said beveled leading edge comprising a lower leading edge and a higher trailing edge.

20. A load stabilizing insert as set forth in claim 19, comprising a first contact plate and a second contact plate, and wherein said first contact plate comprises a first beveled edge, and wherein said second contact plate further comprises a second beveled leading edge.

21. A load stabilizing insert as set forth in claim 20, wherein the first beveled edge has first trailing edge, and wherein said second beveled edge has a second leading edge, and wherein a multi-part, co-planar leading edge is provided by said first beveled edge and by said second beveled edge.

22. A kit for stabilizing a motor vehicle, upon loading, comprising two or more load stabilizing inserts as set forth in claim 1.

23. A kit for stabilizing a motor vehicle, upon loading, comprising four load stabilizing inserts as set forth in claim 15.

24. A kit for stabilizing a motor vehicle having a rear axle with a left side leaf spring pack and a right side leaf spring pack, said left side leaf spring pack and said right side leaf spring pack each having a lower side, said kit comprising:

a right overload spring having a lower side, the right overload spring having a selected thickness T, said right overload spring sized and shaped for installation with said right side leaf spring set;

a left overload spring having a lower side, the left overload spring having a selected thickness $T_L$, said left overload spring sized and shaped for installation with said right side leaf spring set;

four load stabilizing inserts, said load stabilizing inserts each comprising (a) a bottom plate, the bottom plate sized and shaped for attachment to a left overload spring or to a right overload spring, or to both;

(b) a top plate;

(c) a pivot pin that pivotally connects said top plate and said bottom plate;

(d) one or more spacers, said one or more spacers separating said top plate above said bottom plate by at least the thickness T of an adjacent left or right overload spring, said top plate (1) spaced apart from and (2) pivotally adjustable with respect to said bottom plate by an angle alpha (a); and (e) a one or more contact plates, said one or more contact plates supported above said top plate and pivotally adjustable therewith, wherein said top plate and said one or more contact plates, so that in use, each of said load stabilizing inserts are adjustably positionable from an unloaded, standby position not loadable by a left side leaf spring pack or by a right side leaf spring pack, to a loadable position below said left side leaf spring pack or below said right side leaf spring pack.

25. A method for improving stability of a pickup truck when the pickup truck is loaded on a rear axle, said method comprising installing a set of load stabilizing inserts as set forth in claim 15, said set of load stabilizing inserts comprising four load stabilizing inserts; and wherein said set of load stabilizing insets comprise a left front insert, a left rear insert, a right front insert, and a right rear insert.

\* \* \* \* \*

UNITED STATES PATENT AND TRADEMARK OFFICE
CERTIFICATE OF CORRECTION

PATENT NO. : 8,870,169 B2
APPLICATION NO. : 13/791631
DATED : October 28, 2014
INVENTOR(S) : Kay It is certified that error appears in the above-identified patent and that said Letters Patent is hereby corrected as shown below:

IN THE SPECIFICATION:

Column 1, line 49, after the word "including", delete "pickups" and substitute therefore --pickup--.

Column 1, line 54, after the word "vans", delete "sports" and substitute therefore --sport--.

Column 3, line 51, after the word "including", delete "pickups" and substitute therefore --pickup--.

Column 3, line 55, after the word "vans", delete "sports" and substitute therefore --sport--.

Column 3, line 57, after the word "motor", delete "vehicles" and substitute therefore --vehicle--.

Signed and Sealed this
First Day of September, 2015

Michelle K. Lee
*Director of the United States Patent and Trademark Office*